Figure 1:
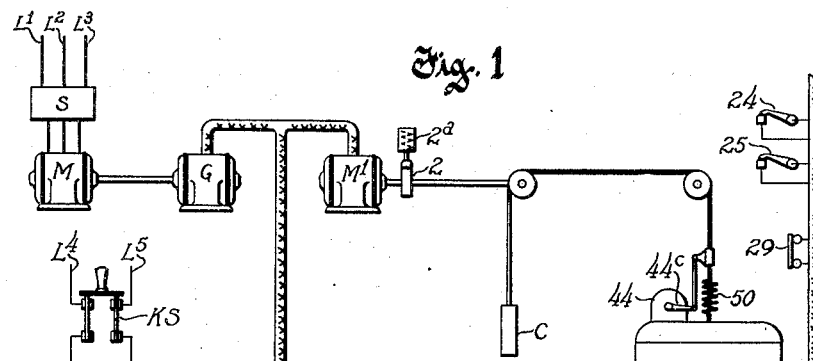
Figure 1:
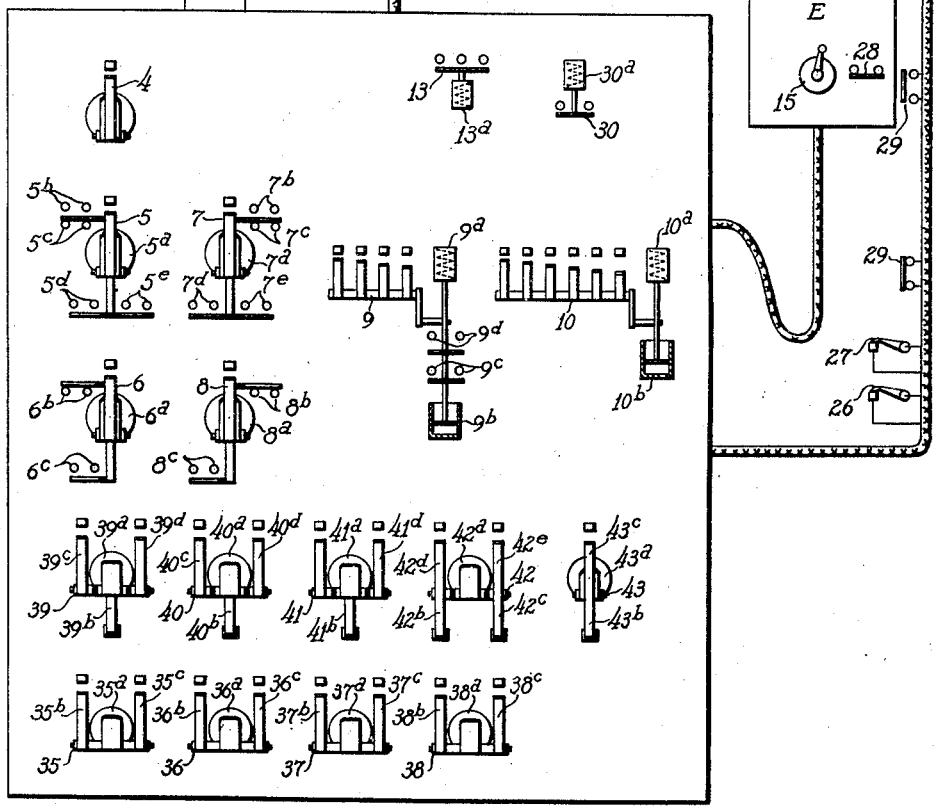

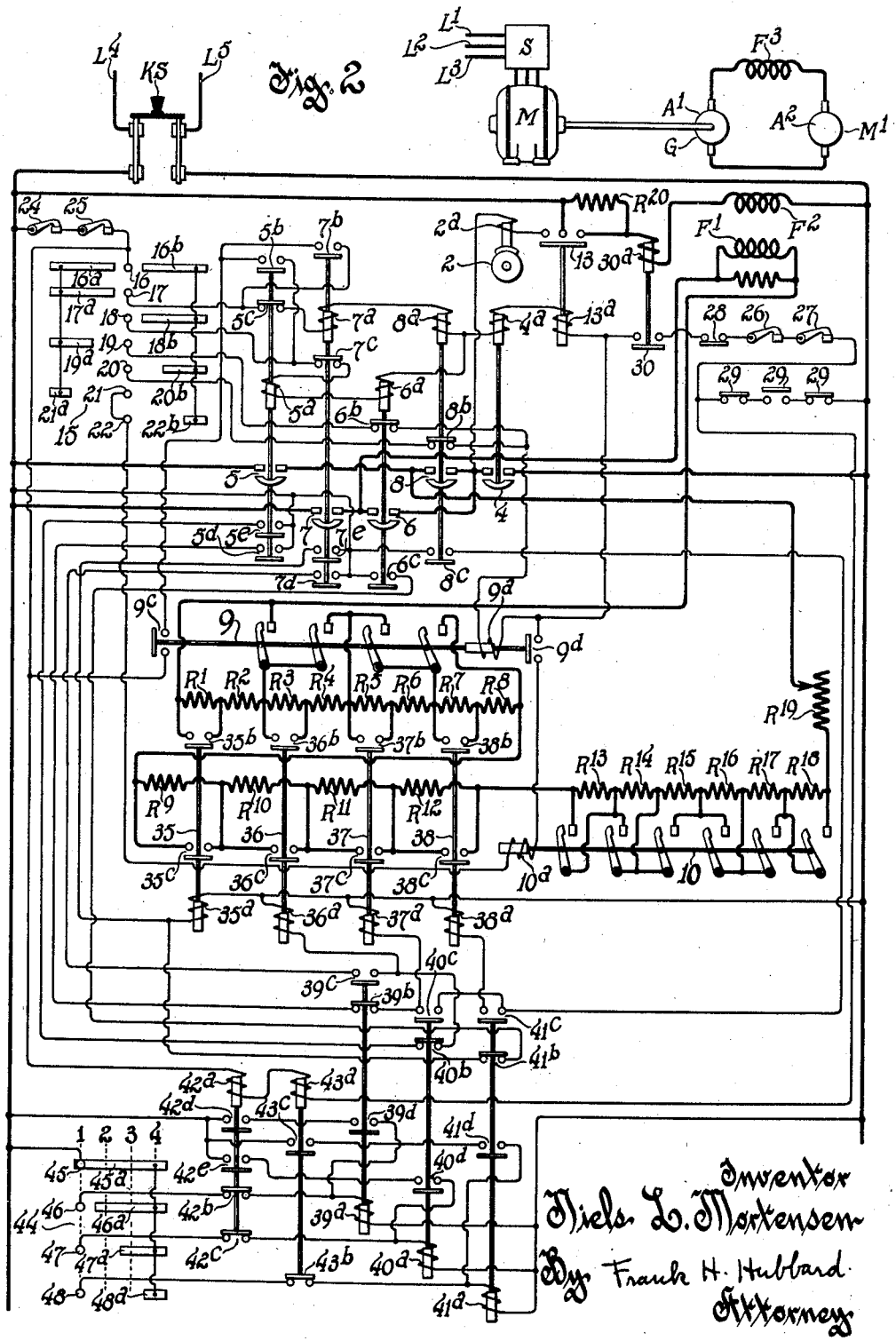

Patented Oct. 17, 1933

1,931,030

UNITED STATES PATENT OFFICE 1,931,030

MOTOR CONTROL SYSTEM

Niels L. Mortensen, Whitefish Bay, Wis., assignor to Cutler-Hammer, Inc., Milwaukee, Wis., a corporation of Delaware Application May 17, 1929, Serial No. 363,959, Renewed September 2, 1930

22 Claims. (Cl. 172—152)

This invention relates to motor control systems for elevators, hoists or similar machines.

The invention will be described as applied to an elevator control system of the Ward-Leonard type wherein the driving motor is supplied with current from a generator and is accelerated, decelerated and reversed by increasing, decreasing and reversing the field of the generator. It is to be understood, however, that the invention is not limited to this particular application thereof.

The invention has among its objects to provide an improved motor control system for elevators and the like which insures smooth and rapid acceleration and deceleration of the driving motor under varying load conditions.

Another object is to provide a controller of the aforesaid character wherein the starting torque, running speed and slowdown of the motor are regulated in accordance with the load in the elevator car.

Another object is to provide a controller of the aforesaid character including load weighing means which is adapted to set up different control combinations prior to starting of the motor for regulation of the starting torque, running speed and slowdown of the motor.

Various other objects and advantages of the invention will hereinafter appear.

The accompanying drawings illustrate an embodiment of the invention which will now be described, it being understood that the embodiment illustrated is susceptible of modification without departing from the spirit and scope of the appended claims.

In the drawings

Figure 1 is a schematic view illustrating the various elements of a controller embodying the invention.

Fig. 2 is an across-the-line diagram illustrating the circuit connections for the controller shown in Fig. 1, Referring to Fig. 1, the same illustrates a motor generator set including a driving motor M and a generator G. Motor M may be of any desired type, as for example a three phase alternating current motor, and as illustrated in the drawing the same is supplied with current from lines $L^1$, $L^2$ and $L^3$ and is started and stopped by any suitable type of controller S. Generator G is provided with an armature $A^1$ and a shunt field winding $F^1$ and the same supplies current to a motor $M^1$. Motor $M^1$ is arranged to drive an elevator E which is provided with the usual counterweight C, and as hereinafter set forth it is assumed that said counterweight tends to overhaul the motor when the car is empty. Motor $M^1$ is provided with an armature $A^2$, a shunt field winding $F^2$ and a series field winding $F^3$. The field winding $F^1$ of the generator and the field winding $F^2$ of the motor are supplied with current from any suitable direct current source, as for example lines $L^4$ and $L^5$, and as shown in the drawing a knife switch KS is employed for connecting and disconnecting said field windings from said source.

The field winding $F^1$ of generator G is controlled through the medium of a single pole electromagnetic switch 4 and two sets of single pole electromagnetic reversing switches 5—6 and 7—8 and the strength of said field winding is regulated by means of resistance sections $R^1$ to $R^{19}$, inclusive. Resistance sections $R^1$ to $R^3$, inclusive, are controlled by an electromagnetically operated resistance varying device 9 while resistance sections $R^{13}$ to $R^{18}$, inclusive, are controlled by an electromagnetically operated resistance varying device 10, and as hereinafter set forth means is also provided for controlling certain of the aforesaid resistance sections in accordance with the load in the elevator car. Resistance varying devices 9 and 10 are provided with electromagnetic operating windings $9^a$ and $10^a$, respectively, and each of said devices is provided with a plurality of normally open contact fingers which are adapted to close successively upon energization of its respective winding. Also the devices 9 and 10 are provided with dash pots $9^b$ and $10^b$, respectively, for retarding opening and closing movements thereof.

The field $F^2$ of motor M is normally connected across lines $L^4$ and $L^5$ through the medium of a resistance $R^{20}$ and a normally open electromagnetic relay 13 is provided for shunting said resistance and for also establishing an energizing circuit for a normally engaged electromagnetic brake 2 associated with motor $M^1$.

Switch 4, reversing switches 5—6 and 7—8 and the resistance varying devices 9 and 10 are all controlled by a master switch 15 which is mounted in the elevator car and includes stationary contacts 16 to 22, inclusive, and two sets of movable contacts arranged on opposite sides thereof. One set of said movable contacts includes contacts $16^a$, $17^a$, $19^a$ and $21^a$, while the other includes contacts $16^b$, $18^b$, $20^b$ and $22^b$. In addition to the aforedescribed control parts the controller includes up limit switches 24 and 25, down limit switches 26 and 27, a car safety switch 28, a plurality of normally closed door switches 29 and a normally open electromagnetic relay 30, all of which are arranged in series in a common supply circuit for the operating windings of the switches which are under the control of the master switch 15. Also as illustrated in Fig. 1, certain of the above described control switches are provided with auxiliary contacts, the purpose of which will be hereinafter set forth.

The function and operation of the controller as thus far described will now be more fully set forth in connection with Fig. 2. Assuming that the knife switch KS is closed, it is apparent from Fig. 2 that the field $F^2$ of motor $M^1$ is connected across lines $L^4$ and $L^5$ by a circuit extending through resistance $R^{20}$ and the operating winding $30^a$ of relay 30. Relay 30 is thus held in closed position, and assuming that the limit switches 24 to 27, inclusive, the car safety switch 28 and the several door switches 29 are all in closed position it is apparent that upon movement of the master switch 15 towards the right into its first speed position the operating windings of switches 4, 7 and 8 and relay 13 will be connected across lines $L^4$ and $L^5$ through the medium of contacts 16, $16^a$, $17^a$ and 17 of the master switch and the auxiliary contacts $5^c$ of reversing switch 5. Relay 13 in responding excludes resistance $R^{20}$ in the field circuit of motor $M^1$ and also connects the operating winding of brake 2 across lines $L^4$—$L^5$ through the medium of main switch 4. Closure of switch 4 and reversing switches 7 and 8 connects the field winding $F^1$ of the generator across lines $L^4$ and $L^5$ through resistance sections $R^1$ to $R^{19}$, inclusive. The generator G then operates to supply current of low voltage to motor $M^1$ for slow speed operation of the latter in its up direction. Movement of the master switch 15 towards the right into its second speed position connects the operating winding of the resistance varying device 9 across lines $L^4$—$L^5$ through the medium of contacts 16, $16^a$, $19^a$ and 19, switches 24 to 29, inclusive, relay 30 and the auxiliary contacts $6^b$ of reversing switch 6. In responding resistance varying device 9 gradually excludes resistance sections $R^1$ to $R^8$, inclusive, to thereby strengthen the field of the generator and increase voltage of the current supplied by the generator G to motor $M^1$ for second speed operation of the latter. Upon initial operation of device 9 its associated contacts $9^c$ close, and upon full operation thereof its associated contacts $9^d$ close. Closure of auxiliary contacts $9^c$ establishes a maintaining circuit for switches 4, 7 and 8 and for relay 13, extending through said auxiliary contacts and auxiliary contacts $7^b$ of reversing switch 7. With master switch 15 in its third speed right hand position an energizing circuit for resistance varying device 10 is established extending through contacts 16, $16^a$, $21^a$ and 21 of said master switch, switches 24 to 29, inclusive, relay 30 and auxiliary contacts $9^d$ of resistance varying device 9. In responding resistance varying device 10 gradually excludes resistance sections $R^{13}$ to $R^{18}$, inclusive, from the field circuit of generator G to thereby increase the voltage of the current supplied by said generator to motor $M^1$ for third speed operation of the latter.

Assuming that the master switch is moved from off position into its first speed left hand position, main switch 4, reversing switches 5—6 and relay 13 are energized through the medium of switches 24 to 29, inclusive, relay 30, contacts 16, $16^b$, $18^b$ and 18 of the master switch and auxiliary contacts $7^c$ of reversing switch 7. Relay 13 in responding acts in the manner above described to increase the field strength of motor $M^1$ and to effect release of brake 2. Also upon response of switches 4, 5 and 6 the field $F^1$ of the motor is connected across lines $L^4$ and $L^5$ through the resistance sections $R^1$ to $R^{19}$, inclusive, and the generator then supplies current to the motor $M^1$ at a voltage for low speed operation of the latter in its down direction. With the master switch 15 in its second speed left hand position the aforedescribed circuit for resistance varying device 9 is established through the medium of contacts 16, $16^b$, $20^b$ and 20 of said master switch and auxiliary contacts $8^b$ of reversing switch 8. Resistance varying device 9 then acts in the manner above described to exclude resistance sections $R^1$ to $R^8$, inclusive, from the field circuit of the generator to increase the voltage of the current supplied by the generator to the motor for second speed operation of the latter in its down direction. Also it should be noted that upon initial operation of device 9 the auxiliary contacts $9^c$ thereof establish a maintaining circuit for switches 4, 5 and 6 and relay 13 through the medium of contacts $5^b$ and $7^c$ of reversing switches 5 and 7. With the master switch 15 in its left hand third speed position the aforedescribed energizing circuit for resistance varying device 10 is established through the medium of contacts 16, $16^b$, $22^b$ and 22 of the master switch, and as above described resistance varying device 10 in responding excludes resistance sections $R^{13}$ to $R^{18}$, inclusive, in the field circuit of the generator to provide for third speed operation of motor $M^1$.

In connection with the foregoing it should be noted that when the master switch 15 is moved directly from off position into either of its third speed positions resistance varying device 10 cannot respond until full operation of resistance varying device 9. Furthermore it should be noted that with the controller arranged as above described motor $M^1$ cannot be reversed until all of the resistance sections $R^1$ to $R^{19}$, inclusive, are reincluded in the field circuit of the generator. In other words, if the controller is in either of its second or third speed positions and is moved directly into a position to effect reversal of the motor the auxiliary contacts $9^c$ associated with the resistance varying device 9 insure against reversal of the field $F^1$ of the generator until resistance varying device 9 returns to normal position. Also it should be noted that the dash pots $9^b$ and $10^b$ in retarding opening movement of their associated devices insure gradual inclusion of the resistance steps to thereby effect a gradual decrease in the field strength of the generator for gradual deceleration of motion $M^1$. Upon interruption of the power connections for the field of the generator, relay 13 drops out to provide for setting of brake 2 and reinclusion of resistance $R^{20}$ in the field circuit of the motor.

In addition to the aforedescribed control means the controller includes a plurality of normally open double pole switches 35 to 38, inclusive, each of which is adapted to shunt certain sections of the resistance in the field circuit of the generator. As shown in Fig. 2 the contacts "b" of switches 35, 36, 37 and 38 are arranged to shunt resistance sections $R^1$, $R^3$, $R^5$ and $R^7$, respectively, while the contacts "c" of said switches are arranged to shunt resistance sections $R^9$, $R^{10}$, $R^{11}$ and $R^{12}$, respectively. As hereinafter set forth, these switches are controlled in accordance with the load in the elevator car and are operated in the following manner.

As hereinbefore stated, under no load conditions in the elevator car the counterweight C tends to overhaul the motor $M^1$ and under this condition switch 35 is maintained closed upon operation of the motor in its up direction, while switches 35, 36 and 37 are maintained closed upon operation of the motor in its down direction. When the load in the elevator car is light, or in other words, substantially balances the lifting force of counterweight C switches 35 and 36 are maintained closed when the motor $M^1$ operates in its up direction and said switches are also maintained closed when said motor operates in its down direction. For medium heavy loads in the elevator car switches 35, 36 and 37 are maintained closed upon operation of the motor in its up direction while switch 35 is maintained closed upon operation of the motor in its down direction. For heavy loads in the elevator car switches 35, 36, 37 and 38 are maintained closed upon operation of the motor in its up direction and none of these switches are closed upon operation of the motor in its down direction.

It is thus apparent that by controlling the switches 35 to 38, inclusive, in the manner above described the voltage impressed upon the motor $M^1$ by the generator G is regulated in a manner which tends to maintain the rate of acceleration and deceleration of the motor and also the running speed thereof in opposite directions substantially constant under varying load conditions.

Switches 35 to 38, inclusive, are controlled by auxiliary contacts associated with reversing switches 5—6 and 7—8 and by relays 39 to 41, inclusive, each of which is provided with a normally closed down contact $b$ and a pair of normally open up contacts $c$ and $d$. Relays 39, 40 and 41 are controlled by relays 42 and 43 and by a load weighing switch 44. Relay 42 is provided with a pair of normally closed down contacts $b$ and $c$ and a pair of normally open up contacts $d$ and $e$, while relay 43 is provided with normally closed down contacts $b$ and normally open up contacts $c$.

The load weighing switch 44 includes stationary contacts 45 to 48, inclusive, and a co-operating drum provided with contacts $45^a$ to $48^a$, inclusive. As shown in Fig. 1, the load weighing switch 44 is mounted on the top of the elevator car and the drum thereof is provided with an operating lever $44^c$ which is connected to the operating cable of elevator E. The operating cable of elevator E is connected to the elevator car by a spring 50 which is adapted to yield in accordance with the load in the elevator car. When the elevator car is empty the contact drum of the load weighing device is held in the position shown in Fig. 2 by the spring connection 50 and upon loading of said car said contact drum is moved to the left from the position shown in Fig. 2 to a degree dependent upon the load.

As shown in Fig. 2, the operating windings of the relays 42 and 43 are arranged to be connected across lines $L^4$ and $L^5$ through the medium of limit switches 24 and 25 and the several door switches 29. Thus if the car is at any landing and the door at such landing is open the relays 42 and 43 will be in normal position while closure of the door at such landing provides for energization of said relays.

With relays 42 and 43 in normal position the relays 39, 40 and 41 are adapted to be energized by the load weighing switch 44. With load responsive switch 44 in its no load position, or in other words, position one, all of the relays 39, 40 and 41 are disconnected from line $L^4$. However, when the load switch 44 is moved to its second position, or in other words its light load position, relay 39 is connected across lines $L^4$—$L^5$ through the medium of contacts $42^b$ of relay 42. When the elevator car has a medium heavy load therein the load switch 44 occupies its third position and relay 39 is then energized as hereinbefore described while relay 40 is connected across lines $L^4$ and $L^5$ through the medium of contacts $42^c$ of relay 42. When the elevator car has a heavy load therein the load switch 44 occupies its fourth position and relays 39 and 40 are energized as hereinbefore described while relay 41 is also energized through the medium of contacts $43^b$ of relay 43.

As hereinbefore stated, when the car is at any landing and the door switch at such landing is closed, the relays 42 and 43 are adapted to respond. Response of relays 42 and 43 interrupts the aforedescribed energizing circuits for relays 39, 40 and 41, extending through the load switch 44, but if any of the relays 39, 40 or 41 are in closed position at the time the elevator door is closed the same are adapted to be maintained in such position. If relay 39 is closed, the same maintains itself through the medium of its contacts $39^d$ and contacts $42^d$ of relay 42. If relay 40 is closed the same maintains itself through the medium of its contacts $40^d$ and contacts $42^e$ of relay 42 and if relay 41 is closed the same maintains itself through the medium of its contacts $41^d$ and the contacts $43^c$ of relay 43.

From the foregoing it is apparent that relays 39, 40 and 41 are adapted to control resistance switches 35, 36, 37 and 38 in the manner hereinbefore set forth. With no load in the elevator car relays 39, 40 and 41 remain in normal position and during hoisting switch 35 is connected across lines $L^4$—$L^5$ through the medium of auxiliary contacts $7^e$ of reversing switch 7. During hoisting of light loads resistance switch 35 is energized in the above described manner and resistance switch 36 is also energized through the medium of contacts $7^d$ of reversing switch 7 and contacts $39^c$ of relay 39. During hoisting of medium heavy loads resistance switches 35 and 36 are energized in the manner above set forth and also resistance switch 37 is energized through the medium of the auxiliary contacts $8^c$ of reversing switch 8 and contacts $40^c$ of relay 40. During hoisting of heavy loads the resistance switches 35, 36 and 37 are energized as hereinbefore set forth and also resistance switch 38 is energized through the medium of the auxiliary contacts $8^c$ of reversing switch 8 and contacts $40^c$ of relay 40.

During lowering of heavy loans relays 39, 40 and 41 are energized and prevent response of any of the resistance switches 35, 36, 37 or 38. During lowering of medium heavy loads switch 35 is energized through the medium of the auxiliary contacts $6^c$ of reversing switch 6 and contacts $41^b$ of relay 41. During lowering of light loads switch 35 is energized as above described and also resistance switch 36 is energized through the medium of the auxiliary contacts $5^e$ of reversing switch 5 and $40^b$ of relay 40. During lowering of the car with no load therein switches 35 and 36 are energized in the manner above set forth and resistance switch 37 is energized through the medium of auxiliary contacts 5ᵈ associated with reversing switch 5 and contacts 39ʰ of relay 39.

While the invention has been described as applied to an elevator control system of the Ward-Leonard type, it is apparent that the same is not limited to this particular application thereof. For example, the means for maintaining the rate of acceleration and deceleration of the motor and also the running speed thereof in opposite directions substantially constant under varying load conditions can be applied to systems employing motors which are supplied with current from a constant potential source.

What I claim as new and desire to secure by Letters Patent is:

1. In an electric elevator system, the combination with a car and a hoisting motor therefor, of automatic means for accelerating said motor and means mechanically controlled by the load carried by said car for regulating said former means to maintain a substantially constant rate of acceleration under all conditions of load.

2. In an electric elevator system, the combination with a car and a hoisting motor thereof, of automatic means for accelerating said motor, means mechanically adjusted by the load carried by said car for regulating said former means to maintain a substantially constant rate of acceleration under all conditions of load and means for rendering said latter means adjustable only when said car is at rest.

3. In an electric elevator system, the combination with a car and a hoisting motor therefor, of a sectional resistance for controlling acceleration and deceleration of said motor and for also controlling the running speed thereof and automatic means for controlling said resistance to maintain the rate of acceleration and deceleration of said motor and also the running speed thereof substantially constant under varying load conditions, said means including a device mechanically controlled by the load in said car and adapted to effect shunting of certain sections of said resistance.

4. In an elevator control system, the combination with a car and a hoisting motor therefor, of a sectional resistance for controlling said motor, electromagnetic starting means for said motor responsive to shunt certain sections of said resistance in a given interval and means mechanically adjusted by the load in said car for effecting shunting of certain sections of said resistance including resistance sections controlled by said starting means.

5. In an elevator control system, the combination with a car and a hoisting motor therefor, of a sectional resistance for controlling said motor, electromagnetic starting means for said motor responsive to shunt certain sections of said resistance in a given interval, means mechanically adjusted by the load in said car for effecting shunting of certain sections of said resistance including resistance sections controlled by said starting means, and means for rendering said latter means adjustable only when said car is at rest.

6. In an elevator control system, the combination with a car, a hoisting motor therefor and door switches at the respective landings of said car, of automatic means for effecting acceleration and deceleration of said motor, regulating means mechanically adjusted by the load carried by said car and associated with said former means to maintain the rate of acceleration and deceleration of said motor and also the running speed thereof substantially constant under varying load conditions and means under the control of said door switches for preventing adjustment of said regulating means except when said car is at one of its landings.

7. In an elevator system, the combination with a car and a hoisting motor therefor, of automatic means for selectively starting said motor in opposite directions, and means mechanically controlled by the load carried by said car and associated with said former means to provide for acceleration of said motor in either direction and also deceleration thereof at a substantially constant rate under all conditions of load.

8. In an elevator system, the combination with a car, a hoisting motor therefor, and doors at the respective landings of said car each having a switch associated therewith, of automatic means for effecting acceleration and deceleration of said motor, regulating means mechanically adjusted by the load carried by said car and associated with said former means to maintain the rate of acceleration and deceleration of said car and also the running speed thereof substantially constant under varying load conditions, and means under the control of said door switches for preventing a change in the adjustment of said regulating means when said elevator doors are in closed position.

9. In an elevator control system, the combination with a car and a hoisting motor therefor, of a generator for supplying current to said motor, a sectional resistance connected in the field circuit of said generator, a device for excluding certain sections of said resistance from the field circuit of said generator to accelerate said motor and means mechanically controlled by the load in said car for shunting certain sections of said resistance independently of said device.

10. In an elevator control system, the combination with a car, and a hoisting motor therefor, of a generator for supplying current to said motor, a sectional resistance connected in the field circuit of said generator, a device for excluding certain sections of said resistance from the field circuit of said generator to accelerate said motor, means mechanically controlled by the load carried by said car for shunting certain sections of said resistance including resistance sections controlled by said device to maintain a substantially constant rate of acceleration under all conditions of load.

11. In an elevator control system, the combination with a car and a hoisting motor therefor, of a generator for supplying current to said motor, switches for selectively establishing reverse power connections for the field of said generator to provide for operation of said motor in opposite directions, a sectional resistance in the field circuit of said generator, means including a plurality of control devices each for including and excluding a plurality of sections of said resistance for acceleration and deceleration of said motor, switches mechanically controlled by the load carried by said car for shunting certain sections of said resistance to provide for acceleration and deceleration of said motor at a substantially constant rate by said control devices.

12. In an elevator control system, the combination with a car and a hoisting motor therefor, of a generator for supplying current to said motor, switches for selectively establishing reverse power connections for the field of said generator to provide for operation of said motor in opposite directions, a sectional resistance in the field circuit of said generator, means including a plurality of control devices each for including and excluding a plurality of sections of said resistance for acceleration and deceleration of said motor, switches mechanically controlled by the load carried by said car for shunting certain sections of said resistance to provide for acceleration and deceleration of said motor by said devices at a substantially constant rate and means for rendering said latter switches operative only under predetermined conditions.

13. In an electric elevator system, the combination with a car and a hoisting motor therefor, of automatic means for accelerating said motor, and means mechanically controlled by the load carried by said car for regulating the rate of acceleration by said former means in accordance with load conditions.

14. In an electric elevator system, the combination with a car and a hoisting motor therefor, of automatic means for starting and stopping said motor and means associated with said former means and mechanically adjusted by the load carried by said car for regulating the rate of acceleration and deceleration of said motor and also the running speed thereof in accordance with load conditions.

15. The combination with a cable operated elevator car and a driving motor therefor, of a mechanical load weighing device interposed between said car and the operating cable thereof and control means for said motor including means under the control of said device for maintaining a characteristic of said motor substantially constant under varying load conditions.

16. The combination with a cable operated elevator car and a driving motor therefor, of automatic means or accelerating said motor, and means including a mechanical load weighing device interposed between said car and the operating cable thereof for influencing the action of said former means to maintain a substantially constant rate of acceleration under varying load conditions.

17. In an electric elevator system, the combination with a car and a hoisting motor therefor, of a sectional starting and speed regulating resistance for said motor, a device responsive to shunt certain sections of said resistance in a given interval, switches adapted to act independently of said device to also shunt certain of said resistance sections, and means controlled by the load in the elevator car for controlling said latter switches.

18. In an elevator control system, the combination with a car and a hoisting motor therefor, of a sectional resistance adapted to be shunted to effect acceleration of the motor, electromagnetic starting means for said motor responsive to shunt said resistance sections in a given interval, a plurality of switches adapted to act independently of said starting means to effect shunting of certain sections of said resistance, and means mechanically adjusted by the load in said car for controlling said latter switches to provide for acceleration of said motor at a substantially uniform rate under varying load conditions.

19. In an elevator control system, the combination with a car and a hoisting motor therefor, of a sectional resistance or controlling said motor, electromagnetic starting means for said motor responsive to shunt certain sections of said resistance in a given interval, a plurality of switches for shunting certain of the resistance sections controlled by said starting means and a plurality of relays for controlling said switches, said relays being controlled in accordance with load conditions in said car and being adapted to control said switches to maintain a given rate of acceleration of said motor during raising and lowering operations under varying load conditions.

20. In an elevator, the combination of a car having means for weighing the load on the car, driving means for causing the car to travel in the elevator hatchway, and means for pre-regulating arrest of the car at floor levels including a selector pre-set in positions determined by operation of the weighing means while the car is standing at a level, and means for preventing setting of the selector while the car is travelling.

21. In an elevator, the combination of a car, means for arresting the car at floor levels including a dynamic brake, means on the car for weighing the car load, and means responsive to operation of the weighing means for varying the force of the dynamic brake.

22. In an elevator, the combination of a car, an electric motor for causing the car to travel in the elevator hatchway, means on the car for weighing the car load, and means responsive to operation of the weighing means for regulating the speed of the motor.

NIELS L. MORTENSEN.

Certificate of Correction

Patent No. 1,931,030.      October 17, 1933.

NIELS L. MORTENSEN

It is hereby certified that errors appear in the printed specification of the above-numbered patent requiring correction as follows: Page 1, line 73, for "R³" read $R^8$; page 2, line 134, for "motion" read *motor*; page 3, line 138, for "loans" read *loads*; page 4, line 26, claim 2, for "thereof", read *therefor*; page 5, line 45, claim 16, and line 96, claim 19, for "or" read *for*; and that the said Letters Patent should be read with these corrections therein that the same may conform to the record of the case in the Patent Office.

Signed and sealed this 23d day of January, A. D. 1934.

[SEAL]

F. M. HOPKINS,
*Acting Commissioner of Patents.*